United States Patent [19]

April

[11] Patent Number: 4,649,851

[45] Date of Patent: Mar. 17, 1987

[54] HIGH SPEED POWER BOOT FOR CALM AND ROUGH SEAWAYS

[76] Inventor: Edward P. April, 901 River Rd., Mystic, Conn. 06355

[21] Appl. No.: 775,365

[22] Filed: Sep. 12, 1985

[51] Int. Cl.$^4$ .............................................. B63B 1/20
[52] U.S. Cl. ........................................ 114/271; 114/61; 114/274; 114/288; 114/291
[58] Field of Search ............... 114/271, 274, 288, 290, 114/291, 56, 57, 63, 289; 114/61, 355

[56] References Cited

U.S. PATENT DOCUMENTS

| | | | |
|---|---|---|---|
| 2,656,814 | 10/1953 | Kiekhaefer | 114/57 X |
| 2,915,031 | 12/1959 | Johnston | 114/355 X |
| 2,965,061 | 12/1960 | Bank et al. | 114/56 |
| 3,208,421 | 9/1965 | Landes et al. | 114/291 X |
| 3,763,810 | 10/1973 | Payne | 114/291 X |
| 3,870,005 | 3/1975 | Klinger et al. | 114/290 |
| 4,004,534 | 1/1977 | Allison | 114/61 X |
| 4,231,314 | 11/1980 | Peters | 114/291 |

FOREIGN PATENT DOCUMENTS

| | | | |
|---|---|---|---|
| 1025312 | 4/1953 | France | 114/291 |
| 133985 | 9/1929 | Switzerland | 114/289 |

Primary Examiner—Sherman D. Basinger
Assistant Examiner—Paul E. Salmon
Attorney, Agent, or Firm—John Gibson Semmes

[57] ABSTRACT

Hydrocraft, capable of maintaining comfortable seaworthy performance at both low and high speeds, in both calm and rough seas, wherein its hull form coordinates high efficiency of at least two zero deadrise planing surfaces with a wave piercing, wedge effect bow segment. The forward portion of the respective concave sides of the bow intersect at the centerline of the hull. The sides of the forward body of the hull rise from the bottom at the chine, vertically then upwardly and outwardly in a concave curvature, the form of which will load the side skin in tension. At a preselected point above the hull bottom, the sharp edged bow is truncated in a conical, forward sloping surface to provide an upward hydrodynamic force to lift the hull over waves which are higher than the gunwale. The parallel after body is located above the after planing surface, and a conical transom closes the stern. The two zero deadrise planing surfaces, of fluted section will present a positive angle of attack to the water surface when the hull has a zero angle of trim. The craft planing surfaces are step connected.

9 Claims, 10 Drawing Figures

HIGH SPEED POWER BOAT FOR CALM AND ROUGH SEAWAYS

BACKGROUND OF THE INVENTION

This invention encompasses a high speed hydrocraft hull form which, irrespective of size or load, is comfortable, seaworthy, and insures that safe performance may be maintained at both low and high speeds, in both calm and rough seas, without the discomfort and insecurity commonly caused by ramping, pounding, and the pitch excursion phenomena heretofore associated with prior art hulls. The invention is adaptable to various uses of marine surface craft, regardless of mode of propulsion. The term hydrocraft is an abbreviated form of the present invention entitled: High Speed Power Boat for Calm and Rough Seaways.

DESCRIPTION OF THE PRIOR ART

Planing hulls may be classed into two categories, namely those having (a) little or no deadrise for high efficiency on calm water, or (b) those having substantial deadrise, deep V's, to yield a smoother ride in rough water. It is well known that the high efficiency of flat bottom craft cannot be advantageously used at high speed in anything but a flat calm; thus, high speed hydroplanes are limited to running in calm water. The less efficient craft having deep V in vertical section offer a greater tolerance for rough seas but the high prismatic coefficient of lift forward in the bow curves tend to drive the hull upward as the hull enters a wave; moreover a high degree of shock experienced in reentering the sea often results in structural damage and personal injury. Increasing the angle of deadrise in these craft slightly decreases pounding, but greatly increases the surface area exposed to water friction and will dictate an increase in the exposed surface area needed to achieve lift, thereby reducing the overall efficiency of the hull. The trade-off of efficiency for a slightly improved ride would not be necessary if the hull were designed, as is the invention, to preclude the hull being launched into the air.

The bottoms of prior art planing hulls are usually not stepped transversely because a step well forward of the center of mass will tend to accentuate lifting motion induced by passing through a wave. It is accepted that every unstepped hull will, in operation, induce longitudinal dynamic instabilities at an efficient angle of attack. On the other hand, longitudinal steps or strakes are often incorporated to release the hull from the drag of spray, but these cannot affect the angle of attack of the hull relative to the water. In general, planing surfaces of known hydroplanes lack the proper angle of attack to the water when the hull has a zero angle of trim; therefore, the hull must trim up to get lift, unfortunately thus lifting the bow excessively well into the air. Poor visibility forward results when the hull is given a large angle of trim and the helmsman must either be positioned too far forward or inordinately high on the deck for the sake of visibility. To overcome this deficiency, bow sections of some hulls are removed, presenting negative shear of the decks, greatly increasing the danger of burying the bow into a steep wave. Such compromises made to seaworthiness, for the sake of visibility, will not be required if the relative hydrodynamic lifting surfaces are designed as the present invention with a built-in angle of attack to the water, the hull being at a zero angle of trim.

Prior art planing hulls tend toward longitudinal hydrodynamic operational instabilities, such as porpoising, in calm water. This phenomenon is caused by a large proportion of the hull lifting into the air with only the after portion of the hull bottom in contact with the water. When the center of gravity of such craft is located well forward of the hydrodynamic lift area, the stagnation pressure line thus becomes the pivot point. When the thrust moment of such known craft is less than the weight moment, the balance is lost and the hull falls into the water. At this critical instant the angle of attack is lost, the hull becomes wet, with consequent increased drag. All of this forces the bow deeper into the water until the lift on the forebody raises the bow again. Attempting to control and maintain this balance is much like attempting to ride a unicycle. Thus, operators of such craft must coordinate propulsive thrust and lift with screw trim and trim tabs to apply a moment to oppose falling or excessive lifting of the bow, again resulting in obvious loss in efficiency. The hull balance should be built in between two discrete areas of hydrodynamic lift wherein the forward planing surface is slightly forward of the center of gravity. Thus dynamic stability of a two planing surface hull is analogous to that of the stability of a bicycle having two points of support forward and aft of the center of gravity, thereby preventing longitudinal pivoting such as experienced in unicycle travel. Such is the objective of this invention.

In known planing hulls the bow sections thereof are usually configured too blunt to soften the impact of launching upward over an oncoming wave face. These blunt bow sections thus tend to displace excessive volumes of water too rapidly and too far forward of the center of gravity, creating on the hull a large moment of pitch which again results in rapid and excessive pitch excursions. In an attempt to reduce such pitching, marine engineers have sloped the stem aft, in an effort to reduce the forward lifting moment of pitch by shortening the lifting arm, but unfortunately such a sloping stem will actually increase the ramping effect. A sloping stem is not required if the hull is designed, as the invention, to reduce the area of the bow sections, to displace less sea water less rapidly, so that by the time a significant volume has been displaced, the center of lift will be much closer to the center of gravity. Thus the moment of pitch will be diminished. The stem should preferably be vertical near the keel, to slice and push the water aside, rather than push the water downward. Thus the angle between the centerline and the chine of the forebody, in the plan view, is to be no less than 5 degrees and no greater than 15 degrees. Thus the full included angle between the chines of the forebody, which are symmetrical about the centerline, will range between 10 and 30 degrees in the plan view, as the sides initially rise from the bottom.

Shapes of planing hulls of known marine craft are generally dictated by the demands of laminar flow and gentle changes in water particle velocity, associated with displacement efficiency. Graceful curves in the bow and stern sections are required for low speed displacement efficiency, but serve no purpose at planing speed. In fact, as the speed increases, the changes in curvature of the planing surface will become more detrimental. Such curved bow sections accelerate the water non-linearly, greatly increasing drag which requires an increase in propulsive power.

In many known planing hulls, the afterbody comprises reduced vertical cross sections aft to reduce drag at displacement speed. Again, such construction is detrimental for high speed craft because the reduced sections aft create a suction effect. To avoid these deficiencies, the planing craft of this invention combines an unique, reinforced parallel afterbody with stepped, fluted planes on the bottom.

Certain planing hulls define a delta-shaped plan form to slice into the waves attempting to reduce initial bow pitching. The afterbody of such hulls is, by design, so wide relative to the forward portion that the hull tends to be pitched up by the stern as the wave passes aft; therefore, the moment of pitch will attempt to bury the bow into the next oncoming wave. Moreover non-parallel gunwales of such craft create docking problems and it is dangerous to affect a transfer at sea. This delta shape also requires a continuous side surface the length of the hull which will be in contract with the water for its full length, causing more drag.

Most prior art planing hulls require trim tabs off of the after transom to attempt to control the upward excursion of the bow in transit and improve stability and visability at cost to speed and efficiency. Trim tabs are expensive alternatives to an efficient planing hull design such as defined hereinafter.

The following patents and publications comprise the most pertinent prior art which is distinguishable from the ensuing description of the preferred embodiments:

U.S. Pat. No. 3,763,810 (Oct. 9, 1973)
 High Speed Boat with Planing Hull
 Inventor: Peter R. Payne, Silver Spring, Md.
 Assignee: Blade Hulls, Inc., Rockville, Md.
 Filed: March 24, 1972
U.S. Pat. No. 4,048,939 (Sept. 20, 1977)
 Free-flooding Chamber Structuremountable on the Underside of a Watercraft
 Inventor:
  Allen Jones, Jr.,
  5028 Lauderdale Avenue
  Virginia Beach, Va. 23455
Publications in addition to the patents are:
Elements of Yacht Design, page 210 and following
 —author Norman L. Skene, publishers —Kennedy Brothers, Inc. of New York City, copyright 1927
 —35-38 by Kennedy Books.

SUMMARY OF INVENTION

The invention comprises a hull which is composed of monocoque construction for minimum weight, consistent with payload and operational durability and stability. It includes the wave piercing bow, which is loaded in tension when piercing the wave; associated forward transom; two zero deadrise planing surfaces of approximately equal area moment, fixedly or adjustably declined aft to present a positive angle of attack, the planing surfaces being joined by a single step which is immediately forward of the craft center of gravity (CG) irrespective of payload, and a vertically offset conical after transom which is located at the terminus of the parallel after body. Catamaran and trimaran hulls are within the scope of invention.

BRIEF DESCRIPTION OF DRAWINGS

FIG. 6 is a rear view looking forward as defined by line 6—6 in FIG. 2; FIG. 7 is a modification of FIG. 6.

DETAIL OF THE PREFERRED EMBODIMENTS

The Hydrocraft construction is best defined by reference to FIGS. 1-10 inclusive.

Figure 1:
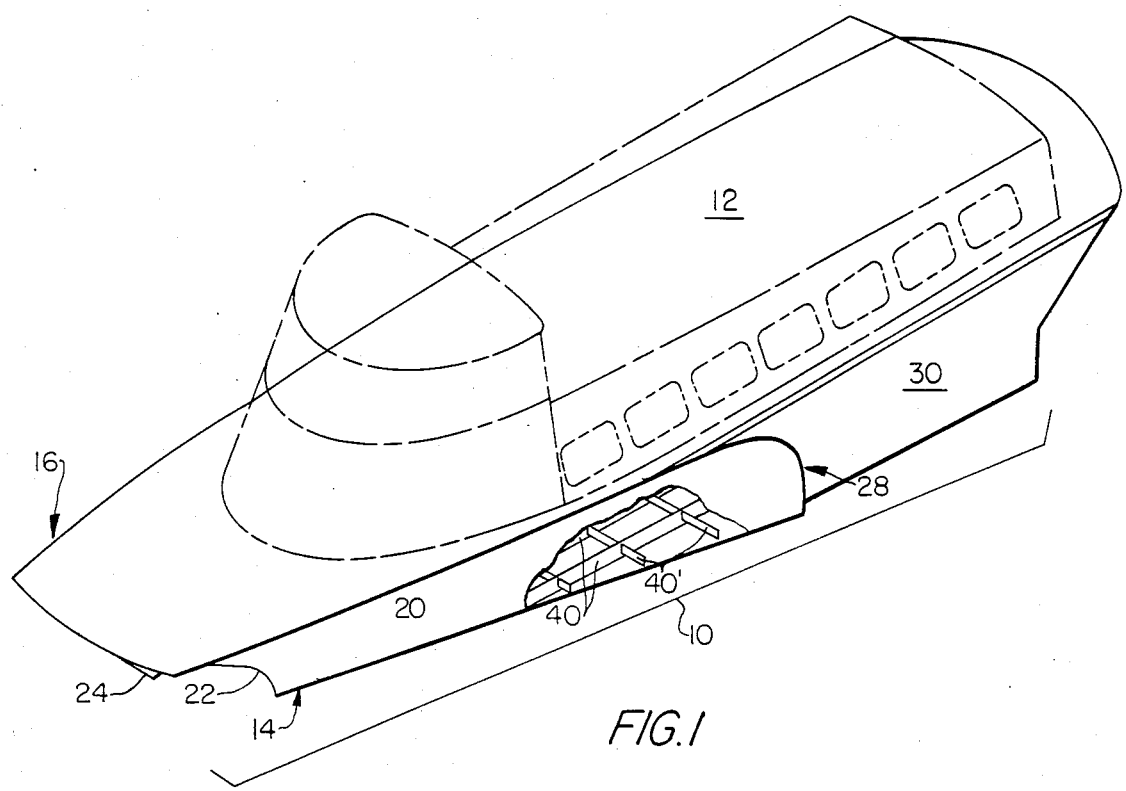
FIG. 1 is an isometric view of invention, one form of superstructure being shown in phantom. A cutaway view into the hull reveals a portion of the hull bottom structure.
Figure 2:
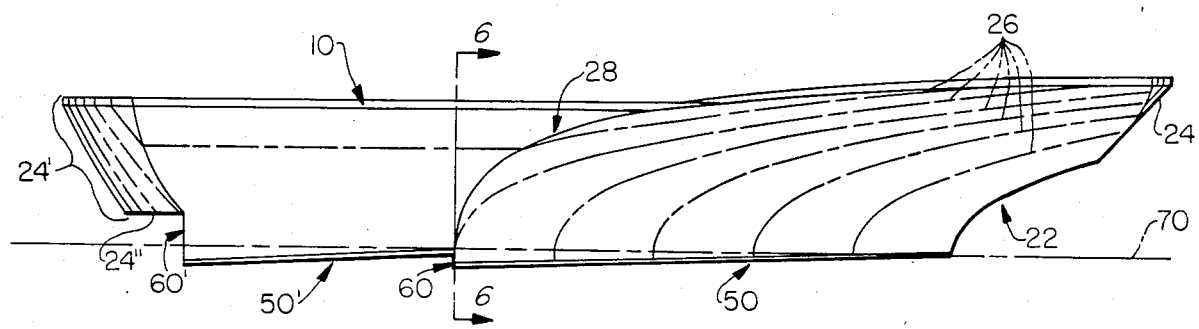
FIG. 2 is a view of invention in side elevation, less the superstructure, wherein the hull buttocks lines are depicted in phantom.
Figure 3:
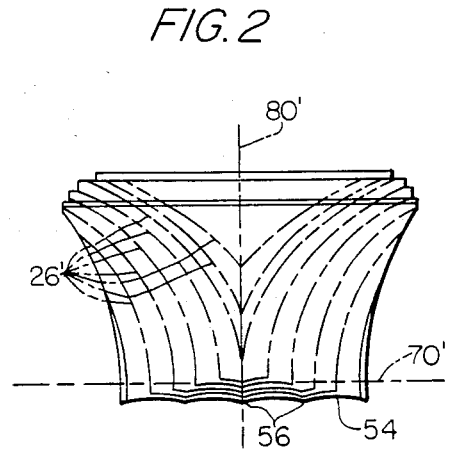
FIG. 3 is a frontal elevation schematic of invention showing the bow and forward body contour, or nautical section lines, in phantom.
Figure 4:
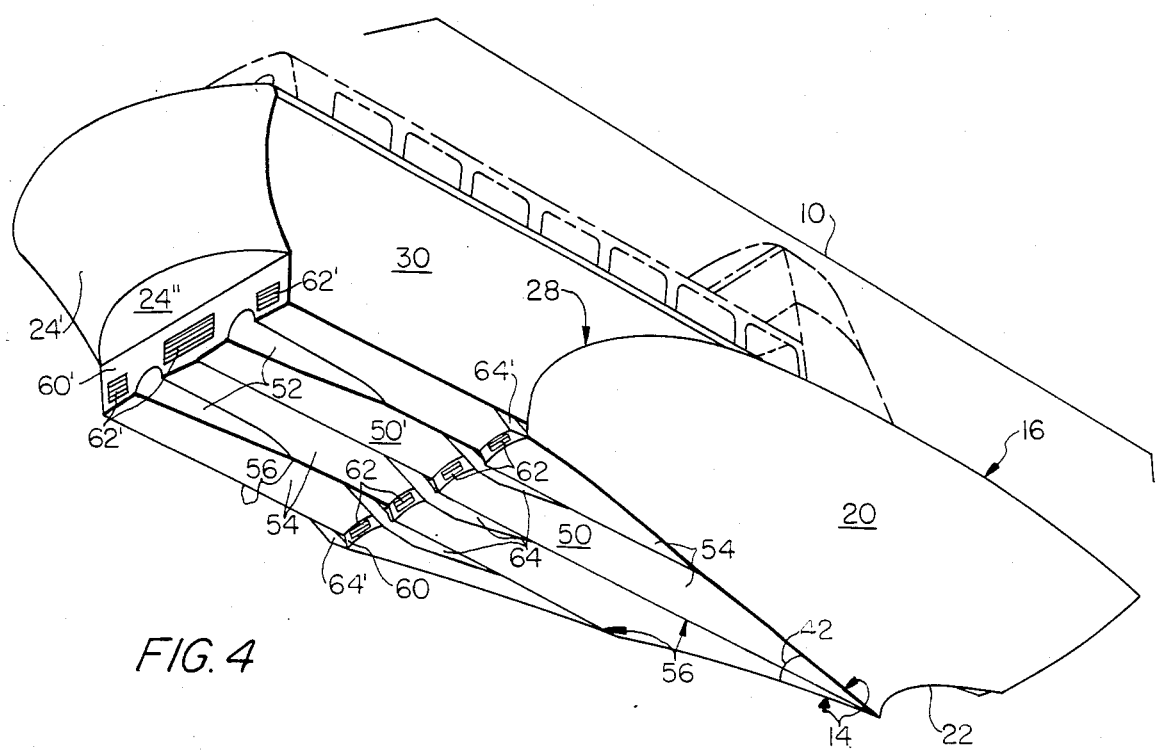
FIG. 4 is a bottom isometric view of the invention of FIGS. 1, 2 and 3.
Figure 5:
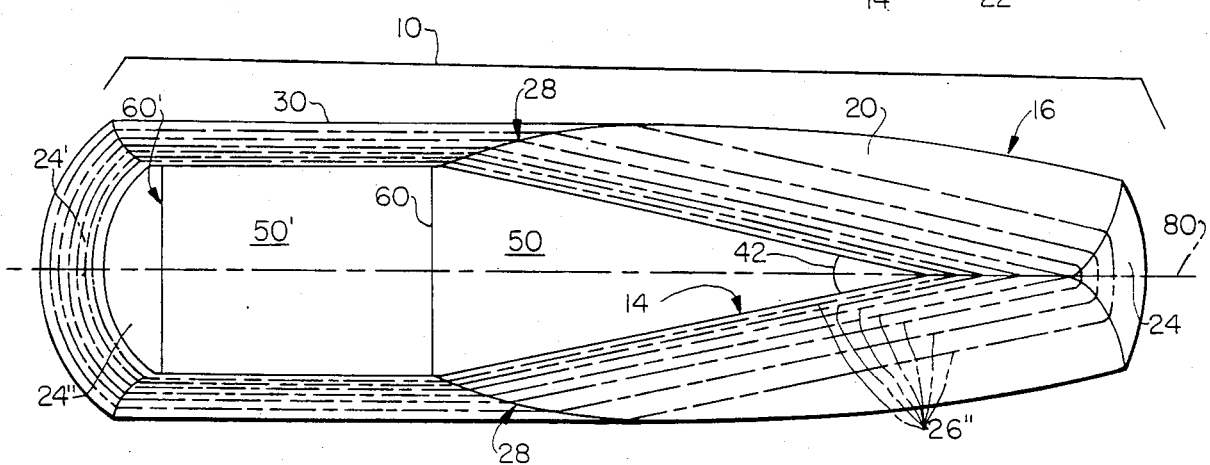
FIG. 5 is a bottom plan view of invention wherein the phantom water lines are shown relative to chine and gunwale.

The basic craft is defined by hull 10 and top deck 12, reference FIG. 1. The craft hull is a single step hull 10 having length to width ratio of approximately five, which comprises wave-piercing bow 20, having a fair body line 22 connecting convex forward transom 24. The fair body line is formed by the intersection of the sides of the forward body. When viewed in side elevation, reference FIG. 2, it is essentially vertical as it rises from the chine 14, it then turns forward as it rises to meet the forward transom 24. This transom truncates the sides in a convexed surface which is inclined at a positive surface slope, as shown in FIGS. 2 and 5. The bow or forward body is shown to define a wedge-shaped concavity in the forward portion of the hull. The full bow angle in plan 42, reference FIGS. 4 and 5, is between 10 and 30 degrees as described above. The forward and after body sides join along knuckle 28 which runs from chine 14 to gunwale 16. The buttock lines, 26, represent 6 vertical slices through the solid hull form from parallel to the plan view and front elevation centerlines 80 and 80' equally spaced from the centerline outward to the maximum beam. The buttock lines geometrically define the elevation view longitudinal contours of the hull form. The section lines 26' shown as phantom in FIG. 3, represent 12 vertical slices through the solid hull form perpendicular to the plan view centerline 80, reference FIG. 5, located at each of the designated stations. The section lines geometrically define the cross sectional contours of the solid hull form. The waterlines 26", shown as phantom in FIG. 5, represent 8 horizontal slices through the solid hull form, equally spaced from the side and front elevation baselines 70 and 70' upward. The waterlines geometrically define the plan view longitudinal contours of the hull form. FIGS. 2, 3, and 5 show how the contours relate to one another to fully define the solid hull form in all three dimensions.

With specific reference to the schematic of FIG. 3, the section lines, otherwise designated as station lines, together with the buttocks lines of FIG. 2 and the waterlines of FIG. 5 define the contour of the bow of the craft, joining the planes from chine 14 to gunwale 16. Attention is also directed to the FIG. 2 buttocks lines which show that the bow and stern transoms have both convex and conical configurations.

FIGS. 4 and 5 are further illustrative of the configuration of the hydrocraft when viewed from the bottom. Here it will be noted that the sharp bow is the resultant of the intersection of the forward wedge sides. The fairbody line is defined by a default resultant of geometric intersection of respective forebody sides. The exterior of the after transom 24' is conical and is inclined at an angle of about 60 degrees from vertical from the bottom to gunwale; whereas the forward transom 24 truncates the concave sides of the bow with a conical surface which is preferably inclined at about 45 degrees to the horizontal. Also depicted in FIGS. 4 and 5 is the afterbody 30 which extends vertically, and outwardly with preferably constant radius, from the after planing surface 50' to the gunwale and horizontally from its intersection with the forward wedge to the forward extreme of the after transom. The exact radius of the concave afterbody sides is not critical to the overall invention and will be a function of skin thickness and hull size. The larger radius is permissible because there are little to no dynamic loads associated with the planing hydrocraft hull as the water from the bow has a velocity that will throw the water away from the hull. As indicated from the drawings of FIGS. 4 & 5, the afterbody sides are of a concavity which create a sharp edged corner which is a default resultant of geometrical intersection of the respective concave forebody and afterbody sides, the latter being parallel to the longitudinal centerline of the hull.

The after portion of the hull 30 contains engines, transmissions, fuel, and a substantial portion of the payload. The after planing surface 50' is terminated by after edge plate 60'. Said edge plate is joined to vertically offset after transom 24' by after transom shelf 24''. The weight moments of the loaded hull maintain a center of gravity which is just aft of the step 60, connecting the forward and after planing surfaces 50—50' to insure that the hull is balanced when on step.

The hull is of simple monocoque construction wherein the skin is only loaded in tension from wave and bottom loadings. The skin is networked within a longitudinal structure sub-assembly; the concave shape of the bow sides gives the skin sub-assembly a large sectional modulus to prevent bending. This construction allows the hull to be fabricated with minimal internal structures, less frames. The skin structure of the bow and connected parallel sides is a very stiff part of the hull assembly.

Figure 6:
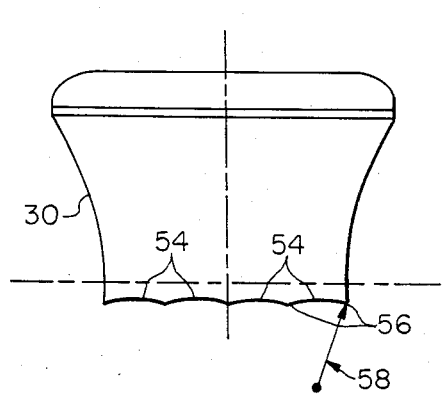
FIGS. 6 & 7 are rear sectional views of the preferred and modified forms of invention less superstructure.
Figure 7:
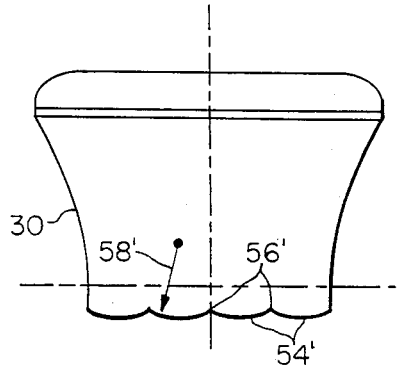

The hull bottom is identified as flat but in reality the bottom has fluted planing surfaces 50—50' to take advantage of placing the skin in tension rather than bending. A fluted double bottom construction of tension skin with flutes 54, 54' of preferably constant radius 58, 58', between ridges 56, 56', reference FIGS. 6 and 7, is used to decrease the structural weight to a minimum, increase the resistance to puncture at high speed, support the engine and fuel tank foundations, and to form a stiff backbone for the hull. The concave configuration of FIG. 6 is preferred; however a convex fluted bottom as shown in FIG. 7 is a possible variation of the fluted design. Fluted plates are stronger than flat plates; however, concave fluted plates will best resist buckling as a result of striking a solid object at speed. The exact radius of the flutes is not critical to the overall invention and will be a function of skin thickness and hull size.

The double bottom is thus the keel of the hull. See FIG. 1 wherein a portion of hull is broken away to reveal a typical view of the construction of the double bottom 40—40'. Longitudinal stiffeners 40 run parallel and continuously over each of the planing surfaces 50 and 50', the bottom edges of said stiffeners forming the ridges 56 or 56'. Transverse stiffeners 40' are interrupted by the perpendicular longitudinal stiffeners. The top edges of the transverse stiffeners meet flush with the top edges of the longitudinal stiffeners; the transverse stiffeners, however, are narrower in width than the longitudinal stiffeners and their bottom edges do not contact the fluted bottom plates 50 and 50'. Tunnels 52 are also a part of the hull bottom, reference FIGS. 4 and 8. The tunnels are included to facilitate proper placement and clearances of propellor shafts and propellors.

From the side elevation base line 70, the planar, zero deadrise surfaces 50—50' of the hull may be hinged, but are shown with a fixed positive angle of attack when the hull has a zero angle of trim, reference FIG. 2. It is critical that the area moment of these surfaces be approximately equal about the step and centerline of the hull. These planing surfaces comprise a fluted composite, reference FIG. 4, wherein the forward plane surface 50 is located forward of the center of gravity, designated CG. Surfaces 50—50' are inclined downwardly and aft to provide a positive angle of attack to the water, said angle possibly being adjustable upon command. The triangular forward planing surface 50 is adapted to skim over the water, providing a line of lift pressure which is forward of the center of gravity to thus prevent potential longitudinal instabilities and to allow some variations in the loading and balance of the hull.

Figure 8:
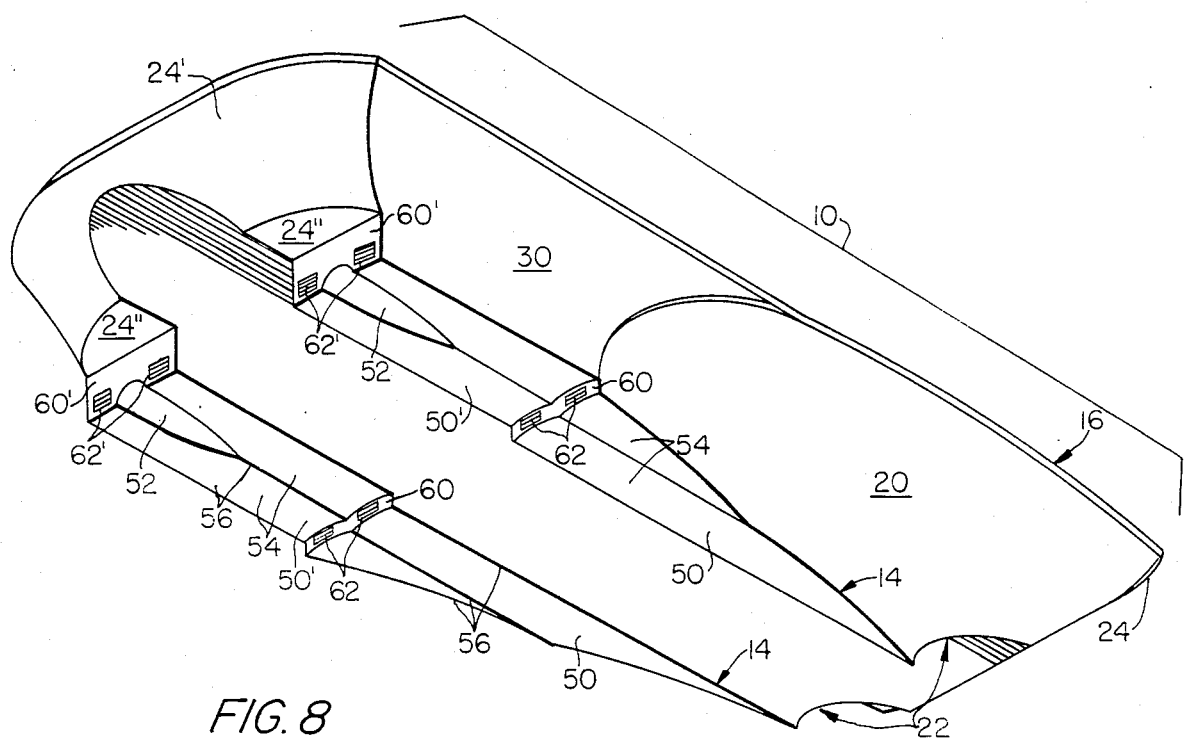
FIG. 8 is a bottom isometric view of the invention in modified catamaran configuration.
Figure 9:
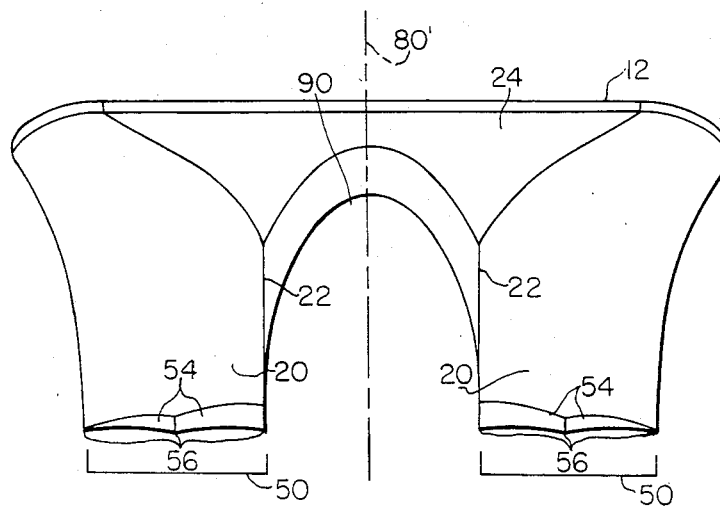
FIG. 9 is a bow elevation of the invention in modified catamaran configuration.
Figure 10:
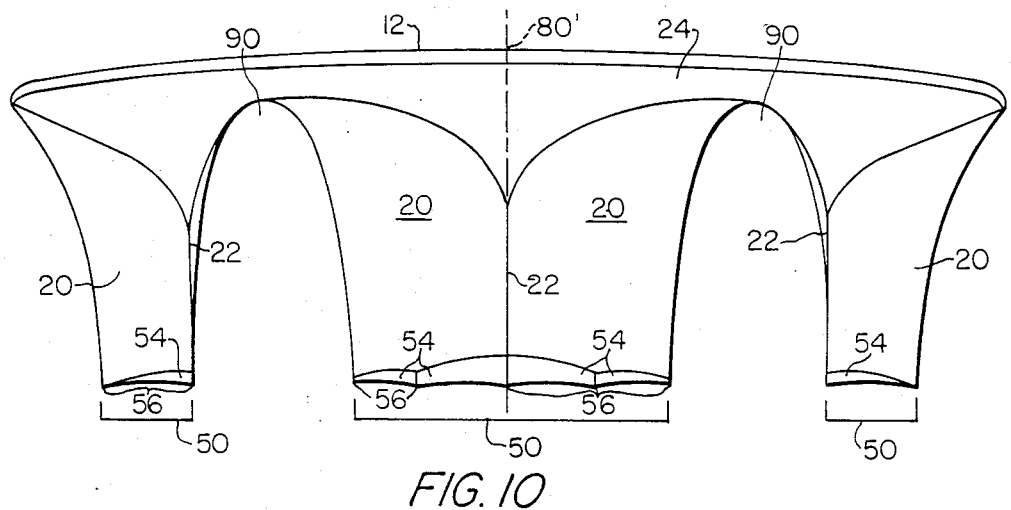
FIG. 10 is a bow elevation of the invention in modified trimaran configuration.

A catamaran or trimaran hull bottom, reference FIGS. 8, 9, and 10, may also be substituted, depending upon the fore-aft division of the planar surfaces. The catamaran and trimaran configurations are essentially identical to the mono-hull design of FIG. 1 with respect to the described hydroplane characteristics. Longitudinal archways 90 join the individual hulls; the hulls are also joined by the common transoms 24, 24' and deck 12. In all variant forms of the invention the center of gravity (CG) is disposed critically with respect to the ventilated step 60 which separates fore from aft planing surfaces. The CG in all embodiments being within 5 percent of hull length aft of a vertical line passing through the centerline of the step 60 in between the respective planing surfaces.

Step 60, being located at the base of the forward planing surface 50 has a width which is equivalent to the width of the planing surfaces at their junction. The step is positively ventilated with air ducted from hull louvers 62, reference FIGS. 4 and 8, to reduce suction generated by the discontinuity of the hull bottom. The louvers are shown in a typical configuration and location. Exact shapes and placement of the louvers will vary with engine design and placement as well as exhaust back pressure limits. After edge plate 60' may also be similarly ventilated by louvers 62'. As shown in FIG. 4, the step is structurally reinforced with skegs 64 and 64'. Such skegs are disposed as shown on each ridge 56; the skegs may be added to the modifications of the invention depicted in FIGS. 7, 8, 9 and 10.

As indicated, the respective planing surfaces 50—50' may be designed so as to be adjustable in angle on command to provide continuous control by the operator to suit speed, sea and loading conditions. Most likely the craft will be built with no adjustable bottom, and therefore the bottom must be built such that the planing surfaces have a built-in angle of attack relative to the hull at zero degrees of trim. This will avoid longitudinal instabilities such as porpoising, so that the wave-piercing bow can be used to advantage in large waves. This interrelationship of the efficient, but stable planing surfaces 50—50' and the wave-piercing bow, maintains the running hull at such an angle that the hull is not launched into the air.

OPERATION

The invention presents a high speed hydrocraft hull which will coactively associate the high planing efficiency of zero deadrise fluted planing surfaces with a wave-piercing bow, the planing surfaces being separated by one ventilated step; a parallel-sided afterbody which will combine therewith to provide a comfortable, safe ride.

In calm water, when the hull is on step, viz. moving at about 35 knots, the high hydrodynamic pressure across the essentially planar bottoms will lift most of the hull out of the water and provide a firm, stable, lateral platform. At the same time the force of the bottom spray will keep the water from clinging to the hull sides. In a heavy sea when maximum waves are equal to the gunwale and when the hull is on step, moving at above 35 knots, the high hydrodynamic pressure across the bottom will lift the hull, maintaining firm lateral stability, whereupon the bow will pierce and pass through, rather than over waves. The resulting hull motion will be a gentle, momentary lifting with minimal pitching. The bow will thus open the waves and flatten the sea so that the parallel afterbody sides can pass through the opening in the wave untouched by drag-producing spray, only the after planing surface being in contact with the wave, such that no spray is attached to the sides of the afterbody.

Whereas the most efficient lifting surface in water is a zero deadrise or flat plate skimming over the surface with an angle of attack to the water between 4 and 7 degrees, the inherent problem with such a flat bottom hull would reside in excessive accelerations associated with its passage over waves. This invention uniquely overcomes the deficiency by adapting an integrated combination to allow flat planing surfaces to be propelled in the sea at high speed, with comfort to the passengers.

As indicated, the wave-piercing bow of this invention has, by configuration, demonstrated ability to move the wave aside rather than pitch and lift the hull. The wake produced from the wave-piercing bow and zero deadrise forward step provides a flat surface of water for the after zero deadrise planing surface to ride upon. This bow works best when the angle of trim of the hull can be maintained at less than two degrees, thus the hull will not be launched over the wave. Stated another way, if the trim of the hull remains, as herein, below two degrees, the hull will not experience high vertical accelerations when running on step and in waves almost the height of the gunwale. Such level running allows for continued good piloting visibility over the bow. When running in waves higher than the gunwale, the forward transom becomes a large area ramp to force the bow upward and over rather than through and under the wave. As the bow pierces the wave, the water particles are initially accelerated to a constant wave opening velocity which is relative to the bow angle and the speed of the hull through the wave. The wave will thus leave the hull at the after end of the wedge shape with the same particle velocity, effectively moving the wave apart with the least propulsive energy requirement, resulting in a higher efficiency and a lower hull structure load. The objective herein is to move the barest minimum quantity of water as gradually as possible so that the hull is decelerated the least, thereby requiring less power to maintain planing speed. For this reason the bow portion terminates at the junction of the afterbody and is not continued for the full length of the hull. In effect, the design of the bow coordinates with that of the after body and planar bottoms to insure that the wedge-effect wave opening is kept at a minimum to reduce power requirements and hull decelerations as the hull pierces the oncoming waves.

Having defined the invention with reference to specific examples, its subject matter is wholly defined by the ensuing claims.

I claim:

1. A power boat for calm and rough water, capable of efficient, comfortable, seaworthy performance at both slow and fast speeds, through both calm and rough seaways, having a monocoque forebody and afterbody hull construction, comprising in combination.

(a) vertical hull sides which are continuously and smoothly of concave curvature from the bottom to the gunwale, the sides of the forebody having greater curvature than sides of the afterbody, wherein both the monocoque construction and curvature provide a stiff and efficient hull structure, said forebody being of wedge-shaped concavity and having an after edge which is terminated vertically and forwardly by an arcuate knuckle between chine and gunwale, said forebody including a bow wherein a sharp concave fairbody line is defined by a default resultant of geometric intersection of respective forebody sides, joining together at an included angle of between 10 and 30 degrees, said fairbody line terminating at its upward extremity in a forward sloped safety transom, the resultant stiffness and weight efficiency of the forebody providing strength to pierce seaways at fast speeds;

(b) an afterbody joined to the rear of the forebody, said afterbody having concave sides which create as a portion of said knuckle a sharp-edged corner which is a default resultant of geometrical intersection of the concave forebody sides with the concave afterbody sides, said afterbody sides being parallel to the centerline of the hull and terminating in a vertically offset rear transom, said afterbody providing an internal volume for propulsion and payload while improving static stability;

(c) a substantially planar, zero-degree deadrise bottom of forebody and afterbody comprising tandem forward and after planing surfaces which project below a baseline of the hull construction, each defining a single-sided strutless foil, the planing surfaces extending the full width of the hull, and presenting an angle of attack to the water between 5 and 10 degrees when the hull is at zero angle of trim, the respective planing surfaces being disposed forward and aft the overall hull center of gravity, each being offset from the other whereby both may be in concurrent contact with the seaways;

(d) an intermediate bottom division step between the tandem foils whereby the summation of the moments of hull mass, propulsion thrust, hydrodynamic lift and drag, and aerodynamic drag are equal to zero about a point which is immediately aft of the forward foil.

2. Hydrocraft according to claim 1 wherein respective forebody and afterbody planing surfaces are of fluted skin, having a curvature between longitudinal ridges.

3. Hydrocraft according to claim 2 wherein respective forebody and afterbody planing surfaces comprise flutes of concave fluted skin.

4. Hydrocraft according to claim 2 wherein respective forebody and afterbody planing surfaces comprise flutes of convex fluted skin.

5. Hydrocraft according either to claims 3 or 4 wherein the flutes are of constant radius.

6. Hydrocraft according to claim 2 wherein respective planing surfaces are divided longitudinally and spaced about the hull centerline to form a catamaran.

7. Hydrocraft according to claim 2 wherein respective planing surfaces are twice divided longitudinally and spaced to form a trimaran.

8. Hydrocraft according to claim 2 wherein skegs engage the hull bottom at a junction and in overlapping relation to the fore and aft planing surfaces.

9. Hydrocraft according to claim 2 wherein the hull bottom planing surfaces are reinforced interiorly with intersecting longitudinal and transverse stiffeners; said transverse stiffeners being disposed out of contact with the planing surfaces.

* * * * *